United States Patent [19]

Solar

[11] Patent Number: 5,254,966
[45] Date of Patent: Oct. 19, 1993

[54] SPINNING PLATFORM WITH CROSSED-POLE MAGNETS

[76] Inventor: Peter Solar, P.O. Box 143, Scarborough, WA 6019, Australia

[21] Appl. No.: 751,051

[22] Filed: Aug. 28, 1991

[51] Int. Cl.⁵ .............................................. H01F 7/02
[52] U.S. Cl. .................................... 335/306; 310/90.5
[58] Field of Search ................ 335/225, 272, 296–306; 310/90.5, 154, 156, 181; 446/256

Primary Examiner—Leo P. Picard
Assistant Examiner—Raymond Barrera
Attorney, Agent, or Firm—Richard C. Litman

[57] ABSTRACT

A spinning magnetic device includes a rotor which may have a capsule for an occupant. The rotor has a number of rotor magnets circularly deployed about its perimeter, all having their dipole axes tangentially directed and all aligned clockwise or counter clockwise. Just outside the circle of magnets is a second, concentric circle of stator magnets. These have their dipole axes radially aligned toward the center of the circles and all directed inward or outward. The number of stator magnets is a multiple of the number of rotor magnets. The rotor magnets are disposed in equal angular separations about the center, as are the stator magnets. The device, when set spinning, experiences perturbations in the rotational speed.

5 Claims, 1 Drawing Sheet

SPINNING PLATFORM WITH CROSSED-POLE MAGNETS

FIELD OF THE INVENTION

The present invention relates to spinning devices with magnets intended for use in zero gravity.

DESCRIPTION OF THE PRIOR ART

Spinning devices often incorporate magnets. Electric motors are one example. However, the prior art does not disclose a rotational device with multiple crossed rotor and stator magnets disposed in concentric circles. Nor does the prior art disclose any magnetic rotational device adapted for use in zero gravity environments.

Accordingly, one object of the present invention is a rotational device which will employ a unique arrangement of rotor and stator magnets, either permanent or electric, to influence the spinning of the rotor.

Another object is a device With movable stator magnets to vary the magnetic interaction between rotor and stator.

These and other objects of the present invention will become readily apparent upon further review of the following specification and drawings.

SUMMARY OF THE INVENTION

The present invention comprises three basic elements. The first is a stator ring of fixed magnets, all of whose magnetic dipoles are radially aligned (all the dipole vectors point toward or away from the center of the ring). The stator magnets are even in number and are deployed at equal angles about the center point.

The second element is a rotor with magnets arrayed in a rotor ring. These magnets' dipole vectors are all tangent to a circle, and all the vectors point in the same sense (clockwise or counterclockwise). The rotor just fits inside the stator, so that the rotor magnets are close to the stator magnets. In one embodiment, the rotor magnets are reversible in polarity.

The crossed or perpendicular dipoles cause perturbations of the rotational motion when the rotor turns, by the forces between the magnets.

The third element is a capsule on the rotor. The capsule is adapted for an occupant to sit within, and may have a control console, life support and amenities.

Means are provided for the stator magnets to be moved toward and away from their positions adjacent the rotary path of the rotor magnets to eliminate the perturbing forces.

The invention is intended primarily for a weightless or zero-gravity environment, such as outer space. In such an environment the rotor will hang motionless within the ring of stator magnets. In a gravity field, the rotor will need to be supported by a bearing.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
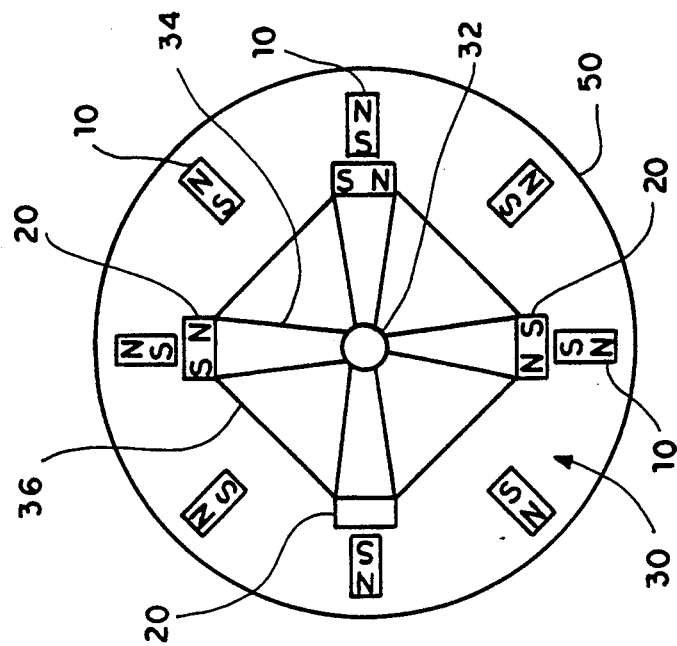
FIG. 2 is a schematic plan view of an embodiment of the present invention which lacks a capsule, showing the arrangement of the magnets.
Figure 1:
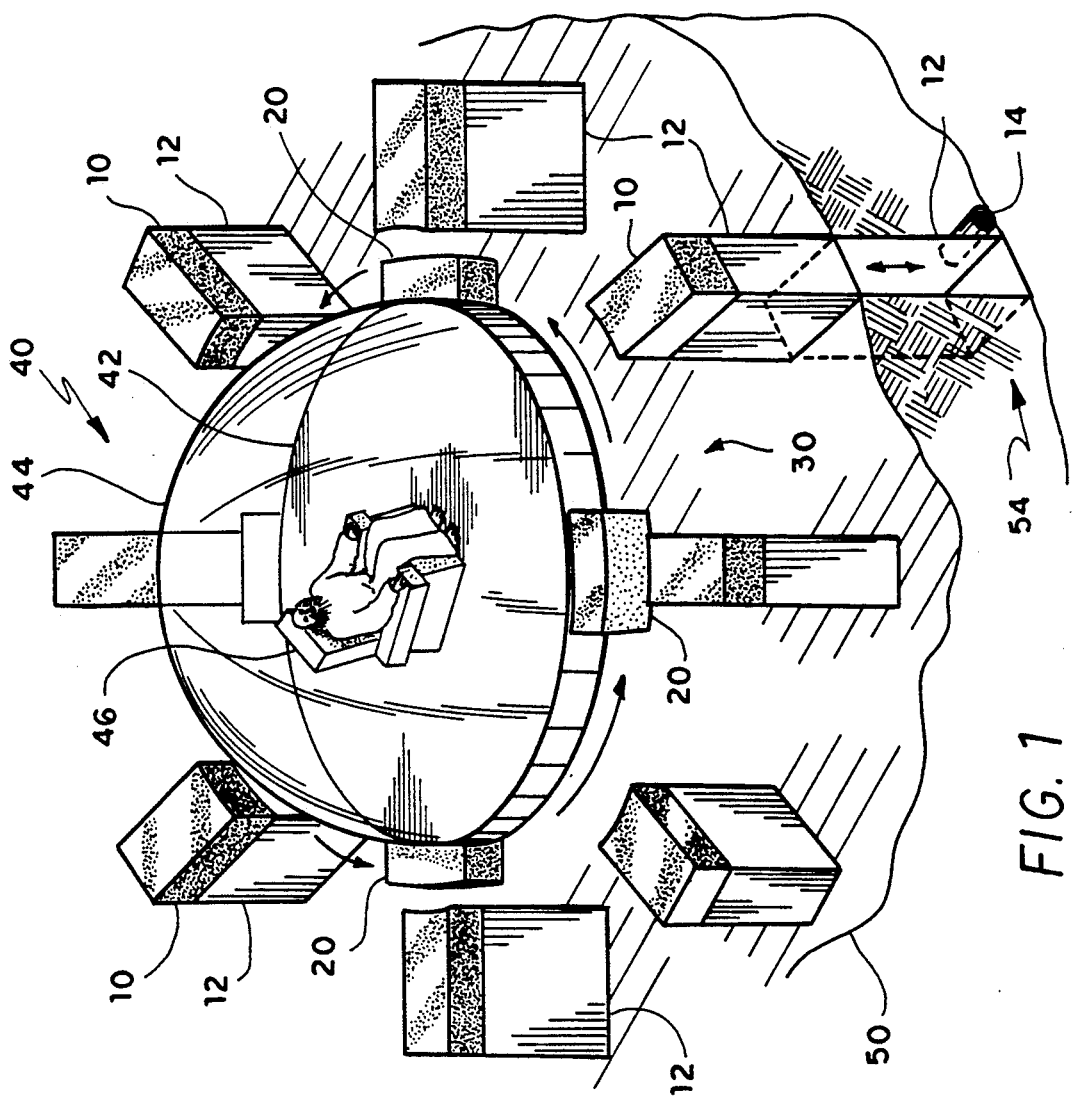
FIG. 1 is a perspective view of the invention in a weightless environment, showing the rotor disc, capsule, and pillars which support the stator magnets.

A preferred embodiment of the present invention intended for use in zero-gravity environments is shown in FIG. 1. The principle of the present invention, and a simplified embodiment for use in gravity fields, is shown in FIG. 2.

The outer ring of stator magnets 10 are deployed in a circle. The included angle from the center of the circle between any two adjacent magnets 10 is the same for any pair. Preferably the angle is 45 degrees, and there are eight stator magnets 10.

The inner ring of rotor magnets 20 are also circularly deployed, but the angle between any two is twice that between the stator magnets 10, i.e., 90 degrees. The number of rotor magnets 20 is generally half that of the number of stator magnets, but there may be any integral number of rotor magnets and a corresponding number of stator magnets equal to some integral multiple of the number of rotor magnets.

There are preferably eight fixed or stator magnets 10 and four rotor magnets 20 as shown in the figures.

The inner circle of rotor magnets 20 and the outer circle of stator magnets 10 are concentric, and all the magnets lie in a common plane.

Each of the magnets, both stator and rotor, has its magnetic dipole aligned to the circles. The magnetic dipole is a vector which points from the south toward the north pole of every magnet, and which describes the strength and orientation of that magnet.

In all embodiments of the present invention the dipoles of the stator magnets 10 are radially aligned (either in or out), and the dipoles of the rotor magnets 20 are aligned tangentially to their circle of deployment (either clockwise or counterclockwise).

In use, the rotor is imparted an initial rotation either clockwise or counter-clockwise. As the rotor spins, the magnets 20 pass by the magnets 10 and forces are generated. These forces cause torques which in turn cause an oscillation or perturbation in the rotational speed.

The function of the device is to impart this oscillating variation in speed. The oscillation will be more complex than if the magnets had aligned dipoles, instead of crossed, when passing by one another.

If the stator magnets 10 are electromagnets, the current to their coils (not shown) can be varied periodically by an electric control circuit (not shown). Proper timing of the variations can result in an increase or decrease of rotational speed.

In the embodiment shown in FIG. 2, the rotor 30 includes a central bearing hub 32 and four radial V-shaped arms 34 extending from the bearing hub 32. Both the stator magnets and the bearing hub are fastened to a base 50 to hold the magnet circles in alignment. The magnets may be connected by reinforcing members 36 to help brace the arms 34 against vibration. The four reinforcing members 36, in the four-magnet, four-arm embodiment, form a square.

The preferred embodiment, shown in FIG. 1, includes a hemispherical capsule 40 for an occupant which also acts as the rotor 30. The capsule 40 includes a disc-shaped base 42, a dome 44, and a seat 46. This embodiment is intended for use in a gravity-free environment, so the rotor 30 and capsule 40 need no bearing or support. Once positioned within the stator ring, it will hang there in the absence of any applied force such as gravity force.

In use, the capsule 40 is given a push to create an initial rotation. This rotation is about a central axis passing through the center of the two circles and perpendicular to the plane of the circles.

The pillars 12 shown in FIG. 1 support the stator magnets 10 above a plane surface 52. The pillars 12 may be adapted to slide in and out of the surface 52. One of the pillars 12 of FIG. 1 is shown, where the surface 52 is cut away, slidably extending below the surface 52 into a slot 54 and connecting to a motor 14 for raising or lowering the pillar 12. This means to move the stator magnets 10 away from the rotor magnets 20 allows control of the proximity of the two sets of magnets, to remove the oscillation due to the magnetic force when desired.

Other means, such a hinges, may be used to move the stator magnets away from the spinning circle of rotor magnets. The stator magnets may move up, down or outward. Any arrangement should allow all of the stator magnets 10 to be moved away simultaneously. Means for controlling the motion by the occupant may be provided, for example, radio control.

The plane surface 52 is preferably of very large extent.

If desired, the edges of the magnets may be circularly curved as shown in FIG. 1. This allows the rotor and stator magnets' faces to be closer, increasing the magnetic force between them.

It is to be understood that the present invention is not limited to the sole embodiment described above, but encompasses any and all embodiments within the scope of the following claims.

I claim:

1. A magnetic device comprising;
   a base;
   a rotor, having an axis of rotation, further comprising a bearing hub mounted on said base to define said axis of rotation and,
   a first number of arms extending radially from said bearing hub perpendicular to said axis of rotation, said arms having a common length and describing a common angle between adjacent ones of said arms, said arms having respective ends distal said bearing hub, and
   rotor magnets, equal in number to said first number, each fixed to a respective one of said ends,
   said rotor magnets disposed in a first circle centered on said bearing hub and having rotor magnetic dipoles tangential to said first circle, all of said rotor magnetic dipoles directed in a one rotational sense about said first circle; and
   a second number of stator magnets disposed in a second circle coplanar, concentric with, and larger than said first circle, said stator magnets having stator magnetic dipoles aligned in radial directions all selectively inward and outward,
   said second number equal to an integral multiple of said first number; whereby
   said rotor may be rotated about said bearing hub to pass said rotor magnets past said stator magnets With the dipoles of the passing magnets at right angles to cause perturbations of rotational speed.

2. The device according to claim 1, wherein said arms are rotatably mounted in said bearing hub, whereby said rotor magnets may be reversed.

3. The device according to claim 1, wherein said arms are V-shaped.

4. A magnetic device comprising:
   a planar surface;
   a rotor, further comprising a disc having an axis of symmetry perpendicular to said planar surface and a capsule upon said disc adapted for an occupant;
   a first number of rotor magnets disposed in a first circle centered on said axis of symmetry, said rotor magnets attached to a perimeter of said disc and having rotor magnetic dipoles tangential to said first circle, all of said rotor magnetic dipoles directed in a one rotational sense about said first circle;
   a second number of pillars extending from said planar surface, having respective ends distal said planar surface,
   said second number equal to an integral multiple of said first number;
   stator magnets, equal in number to said second number, mounted on respective said ends of said pillars and disposed in a second circle coplanar, concentric with, and larger than said first circle, said stator magnets having stator magnetic dipoles aligned in radial directions all selectively inward and outward; and
   means for simultaneously moving said ends of said pillars stator magnets away from said rotor; whereby
   said rotor may be rotated to pass said rotor magnets past said stator magnets with the dipoles of the passing magnets at right angles to cause perturbations of rotational speed, and
   said means for simultaneously moving said ends of said pillars stator magnets away from said rotor may be activated to remove said perturbations.

5. The device according to claim 4 wherein the magnets have curved edges.

* * * * *